(12) United States Patent
Aines et al.

(10) Patent No.: US 8,945,279 B2
(45) Date of Patent: Feb. 3, 2015

(54) POLYMER-ENCAPSULATED CARBON CAPTURE LIQUIDS THAT TOLERATE PRECIPITATION OF SOLIDS FOR INCREASED CAPACITY

(71) Applicant: Lawrence Livermore National Security, LLC, Livermore, CA (US)

(72) Inventors: Roger D. Aines, Livermore, CA (US); William L. Bourcier, Livermore, CA (US); Christopher M. Spadaccini, Oakland, CA (US); Joshuah K. Stolaroff, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 270 days.

(21) Appl. No.: 13/661,900

(22) Filed: Oct. 26, 2012

(65) Prior Publication Data
US 2013/0109074 A1 May 2, 2013

Related U.S. Application Data

(60) Provisional application No. 61/552,870, filed on Oct. 28, 2011.

(51) Int. Cl.
*B01D 53/02* (2006.01)
*B01D 53/14* (2006.01)
*C09K 3/00* (2006.01)
*B82Y 30/00* (2011.01)

(52) U.S. Cl.
CPC . *B01D 53/14* (2013.01); *C09K 3/00* (2013.01); *B01D 53/1475* (2013.01); *B82Y 30/00* (2013.01); *B01D 2252/204* (2013.01); *B01D 2257/504* (2013.01); *Y02C 10/06* (2013.01); *Y02C 10/08* (2013.01); *Y02C 10/04* (2013.01)
USPC .................. 95/139; 95/148; 96/143; 96/150

(58) Field of Classification Search
USPC ............................. 95/139, 148; 96/143, 150
See application file for complete search history.

(56) References Cited

U.S. PATENT DOCUMENTS 6,958,085 B1 * 10/2005 Parrish ............................. 95/44

* cited by examiner

*Primary Examiner* — Robert A Hopkins
(74) *Attorney, Agent, or Firm* — Eddie E. Scott

(57) ABSTRACT

A system for carbon dioxide capture from flue gas and other industrial gas sources utilizes microcapsules with very thin polymer shells. The contents of the microcapsules can be liquids or mixtures of liquids and solids. The microcapsules are exposed to the flue gas and other industrial gas and take up carbon dioxide from the flue gas and other industrial gas and eventual precipitate solids in the capsule.

19 Claims, 7 Drawing Sheets

POLYMER-ENCAPSULATED CARBON CAPTURE LIQUIDS THAT TOLERATE PRECIPITATION OF SOLIDS FOR INCREASED CAPACITY

CROSS-REFERENCE TO RELATED APPLICATIONS

This application claims benefit under 35 U.S.C. §119(e) of U.S. Provisional Patent Application No. 61/552,870 filed Oct. 28, 2011 entitled "polymer-encapsulated carbon capture liquids that tolerate precipitation of solids for increased capacity," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

U.S. patent application Ser. No. 13/312,418 filed Dec. 6, 2011 by Roger D. Aines, Christopher M. Spadaccini, Joshuah K. Stolaroff, William L. Bourcier, Jennifer A. Lewis, Eric B. Duoss, and John J. Vericella for separation of a target substance from a fluid or mixture using encapsulated sorbents discloses systems related to the present invention. Roger D. Aines, William L. Bourcier, Christopher M. Spadaccini, and Joshuah K. Stolaroff are inventors named in this application. The disclosure of U.S. patent application Ser. No. 13/312,418 filed Dec. 6, 2011 by Roger D. Aines, Christopher M. Spadaccini, Joshuah K. Stolaroff, William L. Bourcier, Jennifer A. Lewis, Eric B. Duoss, John J. Vericella for separation of a target substance from a fluid or mixture using encapsulated sorbents is incorporated herein in their entirety for all purposes by this reference.

BACKGROUND

1. Field of Endeavor

The present invention relates to carbon capture and more particularly to polymer-encapsulated carbon capture capsules that tolerate precipitation of solids for increased capacity.

2. State of Technology

Carbon dioxide capture from flue gas and other industrial gas sources is optimally conducted today using liquid sorbents in which a base (e.g. MEA, potassium carbonate, buffers such as phosphate or borate, or ammonia) is dissolved in water at high concentration. The efficiency of these systems is limited by the amount of base that can be dissolved, limiting the carrying capacity of the resulting fluid. As carbon dioxide dissolves in the liquid sorbent, an additional limit can be reached in when solid precipitates form as a result of the increased carbonate concentration. The presence of precipitated solids results in system clogging, erratic capture behavior, and difficulty in the regeneration of the liquid sorbent (typically done in a steam stripper requiring uniform contact between the liquid and the steam).

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention removes the precipitation limitation of the prior art by incorporating the liquid sorbent in a thin polymer shell, forming a liquid filled bead typically 100 um to 1 mm in diameter. This bead now is a self-contained system that can tolerate precipitation of solids during the loading phase, and that presents a uniform physical presence during the regeneration (e.g. steam stripping) phase. In this way the carrying capacity and efficiency of the incorporated liquid solvents can be increased by 25% or more.

The present invention provides a system for carbon dioxide capture from flue gas and other industrial gas sources. The present invention utilizes microcapsules with very thin polymer shells. The contents of the microcapsules can be liquids or mixtures of liquids and solids. The microcapsules are exposed to the flue gas and other industrial gas and take up carbon dioxide from the flue gas and other industrial gas and eventual precipitate solids in the capsule. In one embodiment a process is used to recover the carbon dioxide in pure form by heating the capsules to temperatures of 70 to 200 C causing the carbon dioxide to vaporize and leave the microcapsules. Other embodiments utilize chemical changes or changes in the applied pressure. The present invention has use in carbon dioxide capture from flue gas, industrial gaseous effluents, aqueous solutions, solvents, and air.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 2 illustrates an embodiment of a system for separating carbon dioxide from gas mixtures.

DETAILED DESCRIPTION OF SPECIFIC EMBODIMENTS

Figure 1:
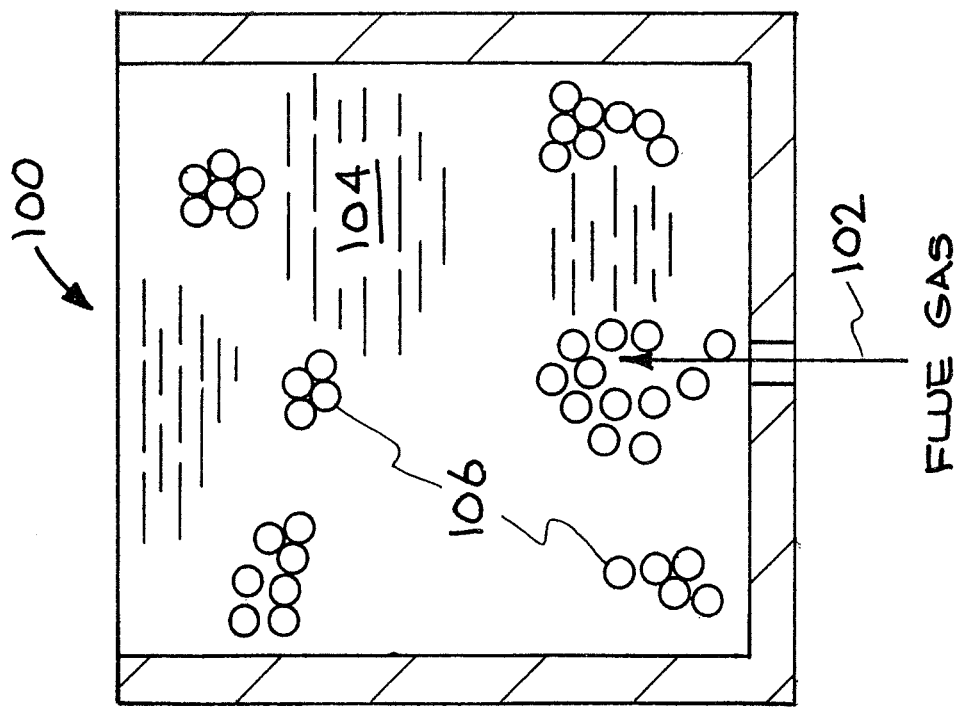
FIG. 1 is a pictorial illustration of a system for separating carbon dioxide from gas mixtures.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Carbon dioxide capture from flue gas and other industrial gas sources is optimally conducted today using liquid sorbents in which a base (e.g. MEA, potassium carbonate, buffers such as phosphate or borate, or ammonia) is dissolved in water at high concentration. The efficiency of these systems is limited by the amount of base that can be dissolved, limiting the carrying capacity of the resulting fluid. As carbon dioxide dissolves in the liquid sorbent, an additional limit can be reached in when solid precipitates form as a result of the increased carbonate concentration. The presence of precipitated solids results in system clogging, erratic capture behavior, and difficulty in the regeneration of the liquid sorbent (typically done in a steam stripper requiring uniform contact between the liquid and the steam). This invention removes the precipitation limitation by incorporating the liquid sorbent in a thin polymer shell, forming a liquid filled bead typically 100 um to 1 mm in diameter. This bead now is a self-contained system that can tolerate precipitation of solids during the loading phase, and that presents a uniform physical presence during the regeneration (e.g. steam stripping) phase. In this way the carrying capacity and efficiency of the incorporated liquid solvents can be increased by 25% or more.

The present invention uses the encapsulation methods to make liquid-filled microcapsules with very thin polymer shells. The present invention specifically deals with the contents of the capsules, which can be liquids or mixtures of liquids and solids. The fact that the polymer shell enforces very strict limits on changes in the chemistry of the interior fluid permits that fluid to be of a composition that, during the reaction with a carbon dioxide-bearing gas, the uptake of carbon dioxide can cause solid precipitates to form in the capsule. A typical capture process would expose these capsules to the gas, with the uptake of carbon dioxide and eventual precipitation of solids in the capsule. One process to recover the carbon dioxide in pure form would be to heat the capsules to temperatures of 70 to 200° C., causing the carbon dioxide to vaporize and leave the capsule. Other processes such as chemical changes, or changes in the applied pressure, could be used.

A specific example is in the use of $K_2CO_3$ as the capture medium. Today solutions of 30 to 40% K2CO3 in water are used to capture carbon dioxide from some industrial processes including production of syn gas from coal. At low temperatures, solid precipitates of $KHCO_3$ precipitate, limiting the capacity. Today the process is almost exclusively used at high temperatures (so called Hot Pot process). However, in the invention described here, the capsules could be loaded at low temperature, including precipitation of $KHCO_3$, up to the point that all the $K_2CO_3$ is reacted according to the reaction $$K_2CO_3 + H_2O + CO_2 \Longrightarrow 2KHCO_3 \qquad \text{[Equation 1]}$$

This leads to a considerable increase in the carrying capacity of the system. Today only 20% solutions can be used at low temperature (below 100 C), but in the limit of this invention the solution could be 50% $K_2CO_3$, an increase of 150% in total $CO_2$ carrying capacity. If this solution is then heated at 145 C, the initial carbon dioxide recovery pressure is 25 psi, falling to 2 psi as recovery completes. This solution can be returned to 40 C to complete the cycle. The carrying capacity in this example is twice that which would be permitted if the grey box (precipitate region) were avoided, and the initial recovery pressure is four times higher.

An advantage is that the minimum water can be kept in the capsule, which minimizes the vaporization of water during recovery and concomitant energy penalty due to that vaporization. The double advantage of high $CO_2$ pressure, which saves in compression of the $CO_2$ for later storage, and low water vaporization, makes this a low energy system. These advantages were known before this invention, but could not be obtained in such a high degree.

This invention permits the increased capacity and reduced operating concerns possible through confining the precipitates inside the capsule, and keeping the overall chemistry constrained inside the capsule. Water and $CO_2$ are free to exchange and move across the polymer to permit the capture reactions to occur, but no cations can move across the polymer.

Referring now to the drawings and in particular to FIG. 1, an embodiment of a system of the present invention is illustrated. The system is designated generally by the reference numeral 100. The system 100 provides a system for carbon dioxide capture from flue gas and other industrial gas sources. As illustrated in FIG. 1 a flue gas 102 is bubbled through a slurry of water 104 and microcapsules 106. Water is optional in the process but is always present in flue gas, even if not in liquid form.

The system 100 utilizes microcapsules 106 with very thin polymer shells. The contents of the microcapsules 106 can be liquids or mixtures of liquids and solids. The microcapsules 106 are exposed to the flue gas and other industrial gas 102 and take up carbon dioxide from the flue gas and other industrial gas and eventual precipitate solids in the capsules 106.

The microcapsules 106 include a polymer coating and stripping solvents encapsulated within the microcapsules 106. The polymer surface layer is permeable to carbon dioxide. The stripping solvents encapsulated within the microcapsules can be any or a mixture of the following: primary, secondary, tertiary, and hindered amines, caustic solutions, ionic buffer solutions, ionic liquids, ammonia, and other solvents having high a solubility of carbon dioxide.

Carbon dioxide is absorbed by passing the flue gas 102 from which the carbon dioxide is to be separated through the slurry made up of water 104 and the microcapsules 106. The carbon dioxide migrates through the polymer coating of the microcapsules 106 and is taken up by the stripping solvents. The carbon dioxide is separated by driving off the carbon dioxide from the microcapsules. The carbon dioxide can be transported to an injection site for sequestration and long-term storage in any of a variety of suitable geologic formations.

Figure 2:
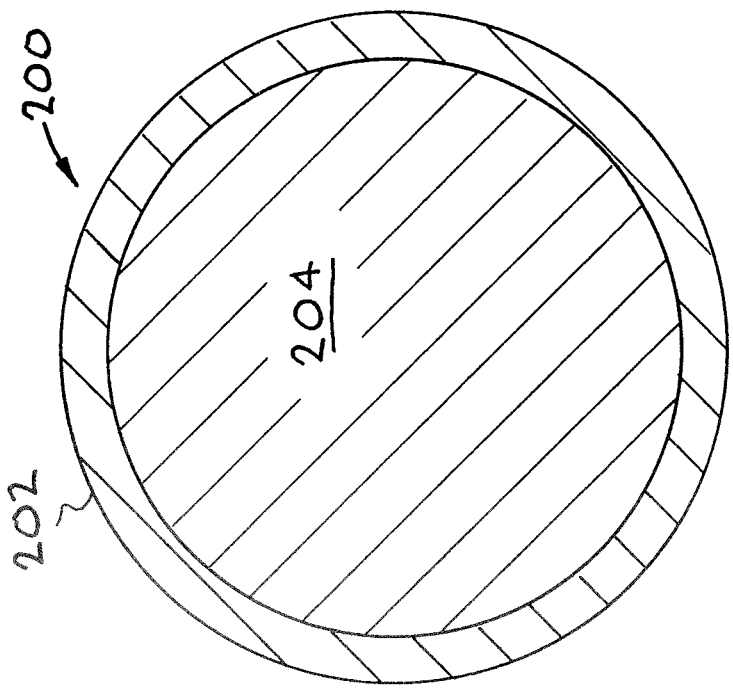
FIG. 2 illustrates an embodiment of one of the capsules shown in FIG. 1.

Referring now to FIG. 2, an embodiment of a microcapsule that can be used as the microcapsules 106 shown in FIG. 1. The microcapsule is illustrated in greater detail. The microcapsule is designated generally by the reference numeral 200. The microcapsule 200 includes a polymer coating 202 and stripping solvents 204 encapsulated within the microcapsule 200. The polymer surface layer 202 is optimally less than 10 microns thick and is very permeable to carbon dioxide. The polymer surface layer 202 is made of any of several families of polymers, including polystyrene, polyethylene, polypropylene, nylon, and others.

The stripping solvents 204 encapsulated within the microcapsule 200 can be any or a mixture of the following: primary, secondary, tertiary, and hindered amines, caustic solutions, ionic buffer solutions, ammonia, ionic liquids, and other solvents having high a solubility of carbon dioxide.

The microcapsule 200 is used to capture carbon dioxide from gas mixtures. The contacting device can be one of several configurations including a fluidized bed, a countercurrent flow, suspended in an aqueous liquid, etc. After loading, the capsules are typically regenerated thermally in a controlled environment where the carbon dioxide is released in pure form suitable for compression and injection into the subsurface. The environment could be that of steam at a partial pressure such that is it in equilibrium with water inside the capsules to prevent water transport into or out of the capsule. Dry heat from a heat exchanger or oil bath could optionally be used at this stage.

The present invention provides the effective use of catalysts to open up a new range of process conditions and methods for industrial $CO_2$ capture, ranging from near-term improvement of existing processes, to longer term enablement of a new process where the working solvent is encapsulated in a polymer coat, minimizing corrosion and solvent degradation problems while greatly reducing the total energy requirement by reducing the water content of the solvent.

The encapsulation of amines within a spherical polymer shell in accordance with the present invention has advantages over conventional amine capture systems. First, isolating the amines within the polymer shell can limit degradation of the solvent and prevent migration of any degradation products formed, thereby reducing corrosion of the capture system. This allows for higher concentrations of solvent and thus higher loadings of $CO_2$, reducing the energy needed for regeneration. Equipment may be smaller and constructed out of less expensive materials, for instance carbon steel in place of stainless steel, when the corrosion products are contained within the capsules and unable to react with the capture device. Second, encapsulation allows novel process designs. For example, a capture system based on encapsulated amines may look like a fluidized bed as opposed to a conventional packed tower. The beads can be agitated either by the flue gas (or stripping gas) or run as a batch process. This new process concept can take advantage of the encapsulation during regeneration by using a stripping that has a lower boiling point and heat of vaporization than water (e.g. methanol). Such alternative gases cannot be used with exposed amine solution, but in an encapsulated system they would enable lower-temperature regeneration without the capital cost and energy requirements of operating the stripper under vacuum.

The present invention provides benefits in fabrication and manufacturability. The beads can be fabricated at a size small enough for efficient mass transfer and large enough for ease of handling. The present invention provides methods to fabricate liquid filled shells in the size range of 100 microns to 1 mm with wall thickness from 5-10 microns.

The present invention provides benefits in survivability and robustness. The present invention identifies several polymers that can withstand typical regeneration temperatures of 100-120° C. In addition, the selected polymers will be capable of withstanding small volumetric changes due to absorption desorption of $CO_2$ and water. Applicants have determined from data on the densities of common $CO_2$ solvents that loading and unloading cycles will not cause a volume increase such that the microcapsule is likely to burst.

The microcapsule 200 shown in FIG. 2 can be used to illustrate other embodiments of the present invention. The microcapsule 200 is illustrative of a system utilizing microcapsules having a coating 202 and stripping material 204 encapsulated in the microcapsules that capture a target substance in a fluid or mixture. The coating 202 is permeable to the target substance and the target substance migrates through said coating 202 and is taken up by the stripping material 204. The target substance is capture by driving off the target substance from the microcapsule 200 thereby separating the target substance from the fluid or mixture.

In one embodiment the coating 202 is made of a porous solid. In another embodiment the coating 202 includes carbon fibers. In yet another embodiment the coating 202 includes carbon nanotubes. The carbon be can be used to provide strength and resilience to the microcapsule 200. The carbon nonotubes can aligned to improve and control permeability of the coating 202. In another embodiment the coating 202 is made of any of several families of polymers, including polystyrene, polyethylene, polypropylene, and nylon. The surface layer 202 is optimally less than 10 microns thick and is very permeable to the target substance.

In one embodiment the stripping solvents 204 encapsulated within the microcapsule 200 can be primary, secondary, tertiary, and hindered amines, caustic solutions, ionic buffer solutions, ammonia, or other solvents having solubility of carbon dioxide encapsulated in the microcapsules. In another embodiment the stripping solvents 204 encapsulated within the microcapsule 200 can be nitrous oxide wherein the nitrous oxide migrates through the coating 202 and is taken up by the stripping material 204. In yet another embodiment the stripping solvents 204 encapsulated within the microcapsule 200 can be sulphates wherein the sulphates migrate through the coating 202 and are taken up by the stripping material 204. In another embodiment the stripping solvents 204 encapsulated within the microcapsule 200 can be hydrogen sulfide wherein the hydrogen sulfide migrates through the coating 202 and is taken up by the stripping material 204.

The present invention is further explained by a number of examples. The examples further illustrate Applicants' system for separating carbon dioxide from a gas mixture. In the examples, the gas mixture and the carbon dioxide are dissolved in water providing water with the dissolved gas and carbon dioxide. The microcapsules have a polymer coating and stripping solvents encapsulated within the microcapsules. The microcapsules containing the stripping solvents are exposed to the water with the dissolved gas and carbon dioxide. The carbon dioxide migrates through the polymer coating and is taken up by the stripping solvents. The carbon dioxide is separated by driving off the carbon dioxide from the microcapsules.

EXAMPLE 1

Figure 3:
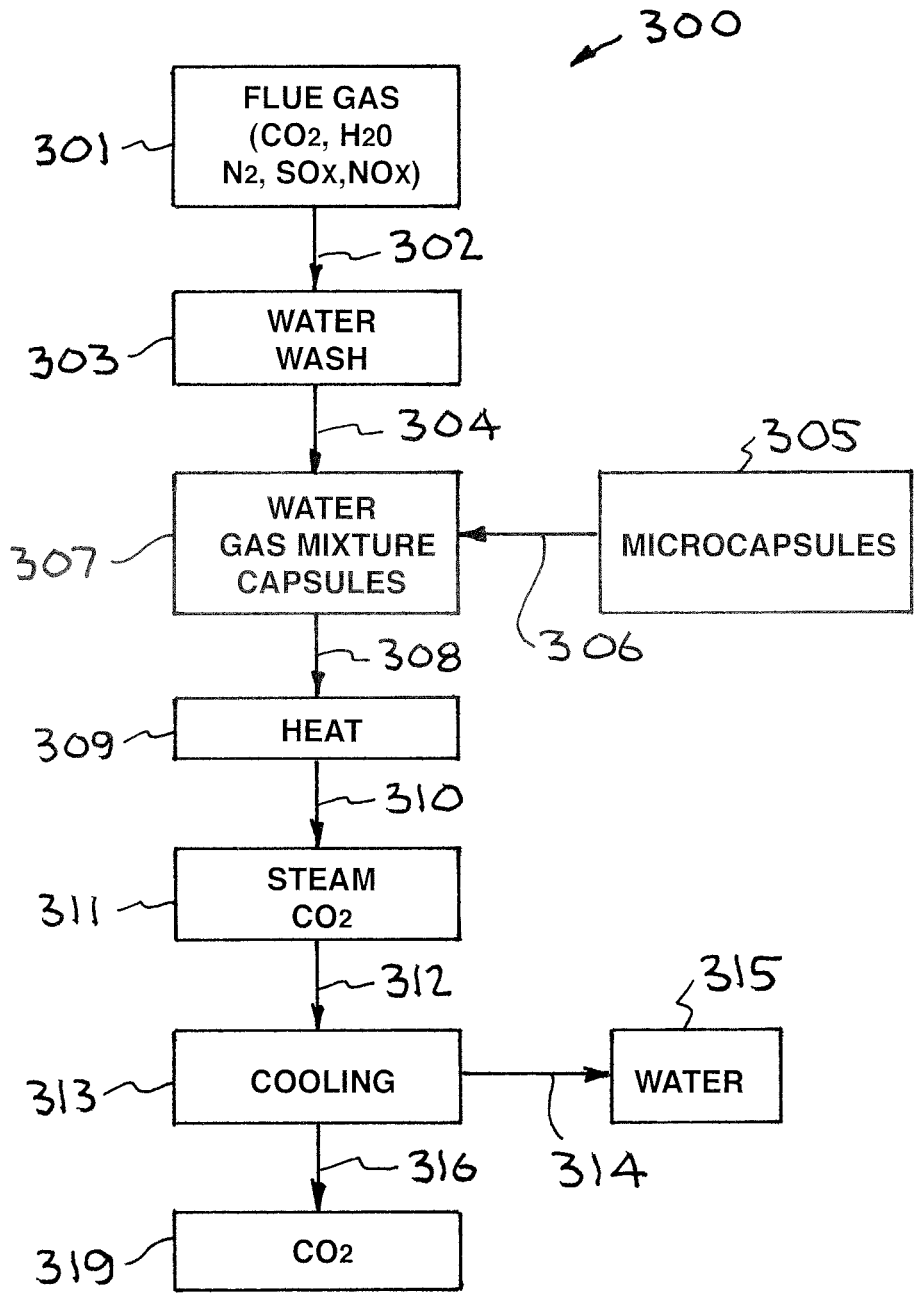
FIG. 3 illustrates another embodiment of a system for separating carbon dioxide from gas mixtures.

In example 1, a system for carbon dioxide removal from gas mixtures is described and illustrated. Example 1 is illustrated by FIG. 3 showing a method of separating $CO_2$. The method is designated generally by the reference numeral 300. The steps of the method 300 are described below.

Method Steps—FIG. 3

Step 1 (Reference Numeral 302)—Flue gas (e.g., $CO_2$, $H_2O$, $N_2SO_x$, $NO_x$) and/or other gas mixtures 301 is processed in a water wash 303. The system/process 300 is thus designed to dissolve flue gas and/or other gas mixtures first in slightly alkaline water as introduced by the water wash 303 prior to producing a concentrate from which a harvested $CO_2$ can be produced. The water wash 303 system itself can be incorporated from known systems utilized by those of ordinary skill in the art. As an illustration only, the common system can include a plurality of spray levels to inject the liquid so as to contact the flue gas, which is designed to flow through such a water wash 303 at a predetermined constant velocity. The number of spray levels can be varied depending on the effective liquid to gas (L/G) ratios. In addition, spray nozzles of different sizes producing different flow rates, spray patterns, and droplet sizes can also be utilized.

Step 2 (Reference Numeral 304)—The water containing the flue gas passes from water wash 303 to an area wherein microcapsules 305 are added forming a slurry 307 of water, microcapsules 305, $CO_2$, and the impurities. Carbon dioxide is absorbed by passing the gas from which the carbon dioxide is to be separated through the slurry 307 either by bubbling, use of an absorber tower, or any other means suitable for absorbing a gas into a liquid. The process for absorbing carbon dioxide or other acid gases is similar to the process used in amine stripping.

The mixed gas is passed through or over a solution of the water containing the microcapsules 305. The water is any water which is desired to be purified during the desorption step. This can be seawater, brine, water compromised by any low-volatility salt or other dissolved component. The water can also be a process fluid that is 100% recycled (not purified) during the desorption stage, but this is less than optimal. The $CO_2$ or other acid gases dissolve in the water and are then absorbed by the microcapsules 305, permitting more to dissolve into the water until saturation is reached.

Step 3 (Reference Numerals 308, 309, 310, & 311)—The mixture of microcapsules containing the $CO_2$ is then heated 309 to the boiling point of water (typically 100.degree. C.) to release the $CO_2$ from the microcapsules 305. During the heating 309 step steam 311 is produced. In order to desorb the carbon dioxide much lower temperatures are required than if the same amines are used free in solution. Carbon dioxide is freely evolved at slightly below 100 degree C. in pure water. This is because there is relatively little carbon dioxide gas in the water (it's partial pressure (fugacity) is lower).

Step 4 (Reference Numerals 312 & 313)—The steam 311 is condensed by cooling 313.

Step 5 (Reference Numerals 314 & 315)—Condensing of the steam 311 produces fresh water 315. With a buffer media that is easily separable (by filtration) from the working liquid medium, it is now possible to use a brine or other compromised water as the feedstock. During the regeneration step the steam which must necessarily be produced can be condensed as fresh water obtaining dual benefit for the energy required to regenerate the $CO_2$. None of the buffer material carries over into the distillate unlike the fairly volatile amines currently used. Most importantly, as the undesirable components of the process water (for instance salt) build up in the bottom of the distilling process, they may periodically be removed and the buffer material easily filtered out from the rejected components for return to the process. This cannot be done easily with any of the dissolved buffer materials currently in use. One advantage is longer buffer life by reduced temperatures and isolation of the buffer material from oxygen.

Step 6 (Reference Numerals 316 & 319)—Condensing of the steam 311 purifies the gas stream coming out of the process to nearly pure $CO_2$ 317. The $CO_2$ 317 can be used or sequestered. The $CO_2$ 317 can be transported to an injection site for sequestration and long-term storage in any of a variety of suitable geologic formations.

EXAMPLE 2

In example 2, a system for simultaneous water purification and carbon dioxide removal from gas mixtures is described and illustrated. Example 2 is illustrated by the method illustrated in FIG. 4. The method is designated generally by the reference numeral 400. The steps of the method 400 are described below.

Figure 4:
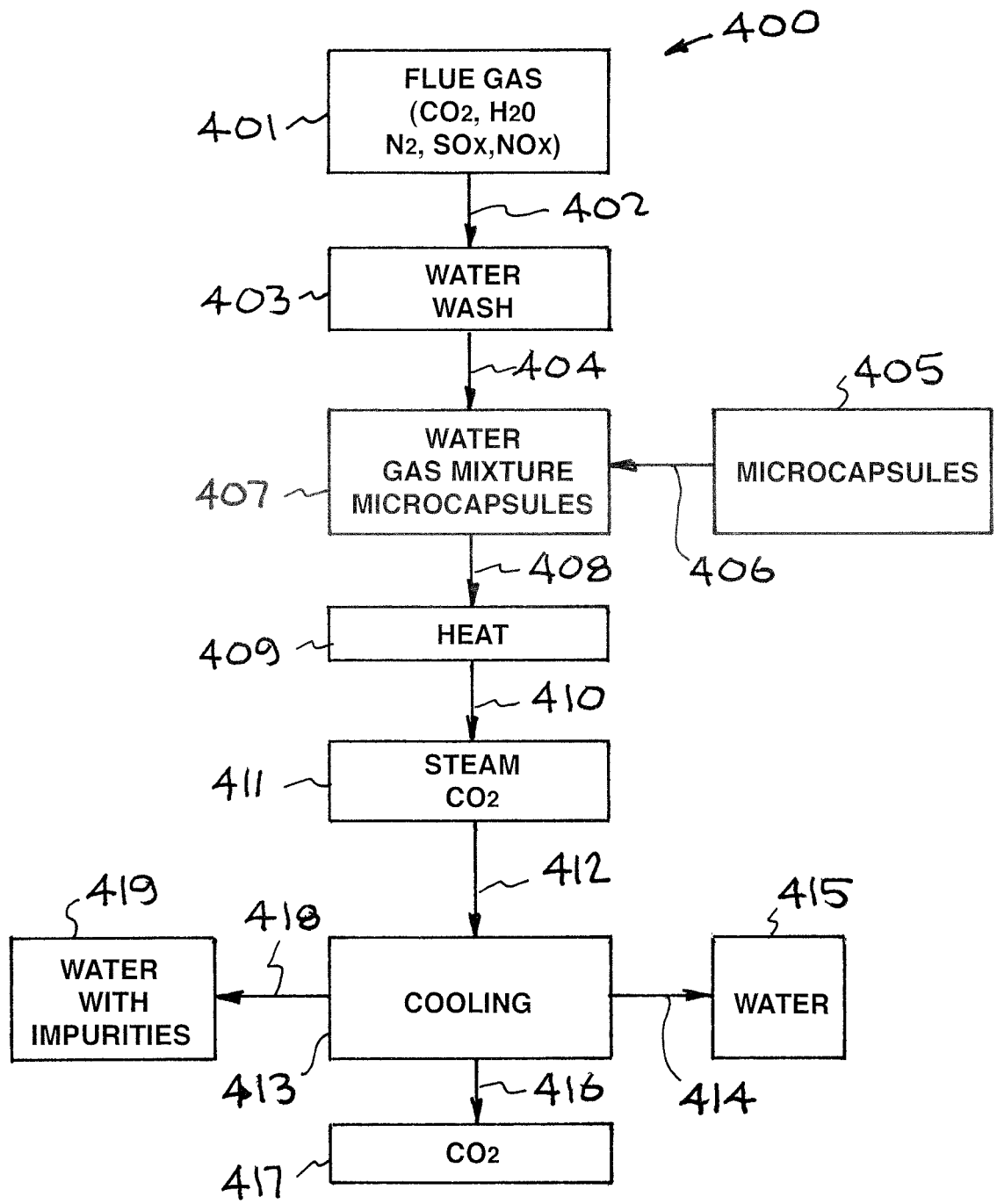
FIG. 4 illustrates yet another embodiment of a system for separating carbon dioxide from gas mixtures.

Method Steps—FIG. 4

Step 1 (Reference Numeral 402)—Flue gas (e.g., $CO_2$, $H_2O$, $N_2SO_x$, $NO_x$) and/or other gas mixtures 401 is processed in a water wash 403. The system/process 400 is thus designed to dissolve flue gas and/or other gas mixtures first in slightly alkaline water as introduced by the water wash 403 prior to producing a concentrate from which a harvested $CO_2$ can be produced. The water wash 403 system itself can be incorporated from known systems utilized by those of ordinary skill in the art. As an illustration only, the common system can include a plurality of spray levels to inject the liquid so as to contact the flue gas, which is designed to flow through such a water wash 403 at a predetermined constant velocity. The number of spray levels can be varied depending on the effective liquid to gas (L/G) ratios. In addition, spray nozzles of different sizes producing different flow rates, spray patterns, and droplet sizes can also be utilized.

Step 2 (Reference Numeral 404)—The water containing the flue gas passes from water wash 403 to an area wherein microcapsules 405 are added forming a slurry 407 of water, microcapsules 405, $CO_2$, and the impurities. Carbon dioxide is absorbed by passing the gas from which the carbon dioxide is to be separated through the slurry 407 either by bubbling, use of an absorber tower, or any other means suitable for absorbing a gas into a liquid. The process for absorbing carbon dioxide or other acid gases is similar to the process used in amine stripping.

The mixed gas is passed through or over a solution of the water containing the microcapsules 405. The water is any water which is desired to be purified during the desorption step. This can be seawater, brine, water compromised by any low-volatility salt or other dissolved component. The water can also be a process fluid that is 100% recycled (not purified) during the desorption stage, but this is less than optimal. The $CO_2$ or other acid gases dissolve in the water and are then absorbed by the microcapsules 405, permitting more to dissolve into the water until saturation is reached.

Step 3 (Reference Numerals 408, 409, 410, & 411)—The mixture of microcapsules containing the $CO_2$ is then heated 409 to the boiling point of water (typically 100.degree. C.) to release the $CO_2$ from the microcapsules 405. During the heating 409 step steam 411 is produced. In order to desorb the carbon dioxide much lower temperatures are required than if the same amines are used free in solution. Carbon dioxide is freely evolved at slightly below 100 degree C. in pure water. This is because there is relatively little carbon dioxide gas in the water (it's partial pressure (fugacity) is lower).

Step 4 (Reference Numerals 412 & 413)—The steam 411 is condensed by cooling 413.

Step 5 (Reference Numerals 414 & 415)—Condensing of the steam 411 produces fresh water 415. With a buffer media that is easily separable (by filtration) from the working liquid medium, it is now possible to use a brine or other compromised water as the feedstock. During the regeneration step the steam which must necessarily be produced can be condensed as fresh water obtaining dual benefit for the energy required to regenerate the $CO_2$. None of the buffer material carries over into the distillate unlike the fairly volatile amines currently used. Most importantly, as the undesirable components of the process water (for instance salt) build up in the bottom of the distilling process, they may periodically be removed and the buffer material easily filtered out from the rejected components for return to the process. This cannot be done easily with any of the dissolved buffer materials currently in use. One advantage is longer buffer life by reduced temperatures and isolation of the buffer material from oxygen.

Step 6 (Reference Numerals 416 & 417)—Condensing of the steam 411 purifies the gas stream coming out of the process to nearly pure $CO_2$ 417. The $CO_2$ 417 can be used or sequestered. The $CO_2$ 417 can be transported to an injection site for sequestration and long-term storage in any of a variety of suitable geologic formations.

Step 7 (Reference Numerals 416 & 417)—Condensing of the steam 411 with removal of the $CO_2$ 417 and water 415 leaves water with impurities 419.

EXAMPLE 3

In example 3, a system for simultaneous water purification and carbon dioxide removal from gas mixtures is described and illustrated. Example 3 is illustrated by the method illustrated in FIG. 5. The method is designated generally by the reference numeral 500. The steps of the method 500 are described below.

Figure 5:
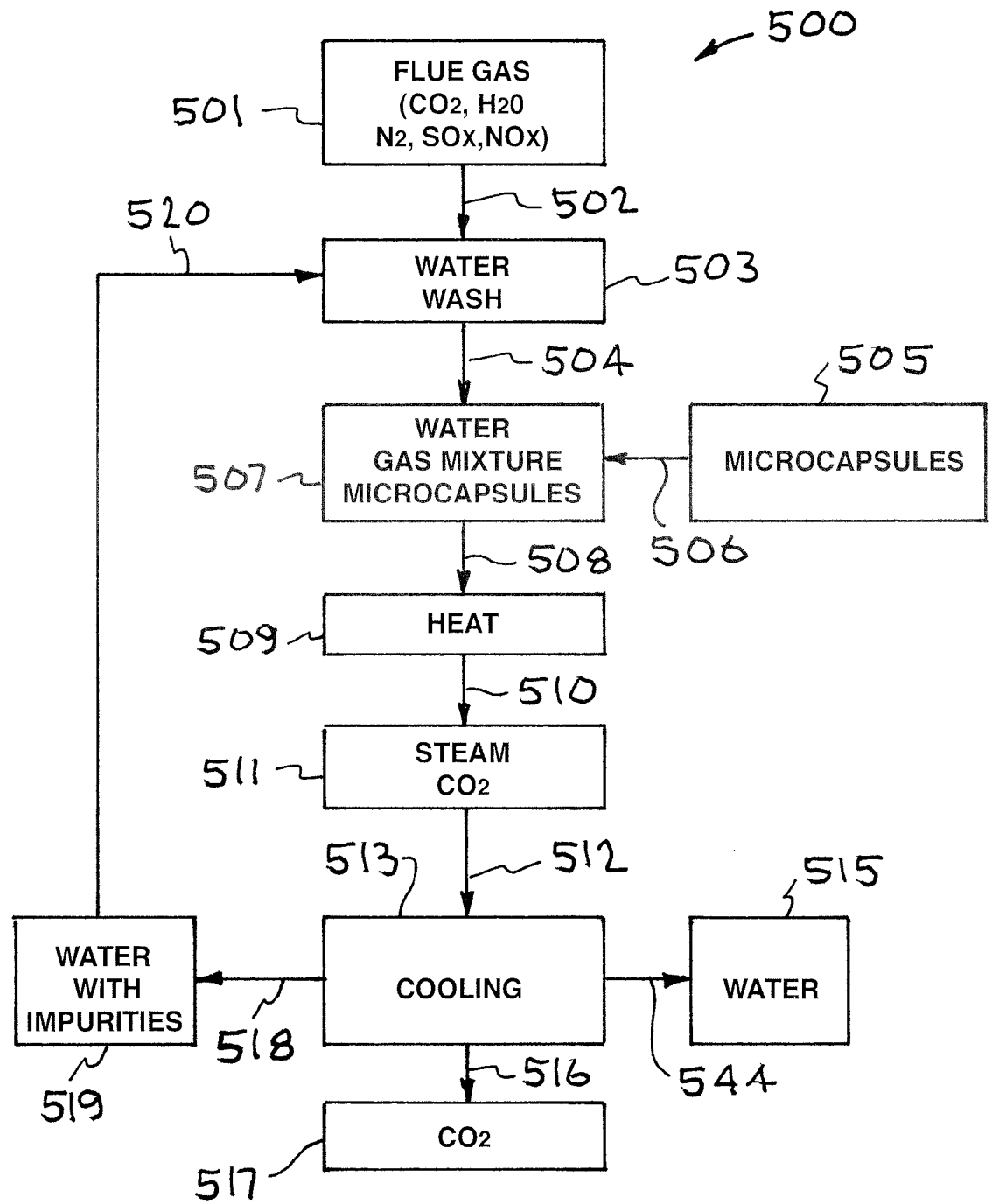
FIG. 5 illustrates yet another embodiment of a system for separating carbon dioxide from gas mixtures.

Method Steps—FIG. 5

Step 1 (Reference Numeral 502)—Flue gas (e.g., $CO_2$, $H_2O$, $N_2SO_x$, $NO_x$) and/or other gas mixtures 501 is processed in a water wash 503. The system/process 500 is thus designed to dissolve flue gas and/or other gas mixtures first in slightly alkaline water as introduced by the water wash 503 prior to producing a concentrate from which a harvested $CO_2$ can be produced. The water wash 503 system itself can be incorporated from known systems utilized by those of ordinary skill in the art. As an illustration only, the common system can include a plurality of spray levels to inject the liquid so as to contact the flue gas, which is designed to flow through such a water wash 503 at a predetermined constant velocity. The number of spray levels can be varied depending on the effective liquid to gas (L/G) ratios. In addition, spray nozzles of different sizes producing different flow rates, spray patterns, and droplet sizes can also be utilized.

Step 2 (Reference Numeral 504)—The water containing the flue gas passes from water wash 503 to an area wherein microcapsules 505 are added forming a slurry 507 of water, microcapsules 505, $CO_2$, and the impurities. Carbon dioxide is absorbed by passing the gas from which the carbon dioxide is to be separated through the slurry 507 either by bubbling, use of an absorber tower, or any other means suitable for absorbing a gas into a liquid. The process for absorbing carbon dioxide or other acid gases is similar to the process used in amine stripping.

The mixed gas is passed through or over a solution of the water containing the microcapsules 505. The water is any water which is desired to be purified during the desorption step. This can be seawater, brine, water compromised by any low-volatility salt or other dissolved component. The water can also be a process fluid that is 100% recycled (not purified) during the desorption stage, but this is less than optimal. The $CO_2$ or other acid gases dissolve in the water and are then absorbed by the microcapsules 505, permitting more to dissolve into the water until saturation is reached.

Step 3 (Reference Numerals 508, 509, 510, & 511)—The mixture of microcapsules containing the $CO_2$ is then heated 509 to the boiling point of water (typically 100.degree. C.) to release the $CO_2$ from the microcapsules 505. During the heating 509 step steam 511 is produced. In order to desorb the carbon dioxide much lower temperatures are required than if the same amines are used free in solution. Carbon dioxide is freely evolved at slightly below 100 degree C. in pure water. This is because there is relatively little carbon dioxide gas in the water (it's partial pressure (fugacity) is lower).

Step 4 (Reference Numerals 512 & 513)—The steam 511 is condensed by cooling 513.

Step 5 (Reference Numerals 514 & 515)—Condensing of the steam 511 produces fresh water 515. With a buffer media that is easily separable (by filtration) from the working liquid medium, it is now possible to use a brine or other compromised water as the feedstock. During the regeneration step the steam which must necessarily be produced can be condensed as fresh water obtaining dual benefit for the energy required to regenerate the $CO_2$. None of the buffer material carries over into the distillate unlike the fairly volatile amines currently used. Most importantly, as the undesirable components of the process water (for instance salt) build up in the bottom of the distilling process, they may periodically be removed and the buffer material easily filtered out from the rejected components for return to the process. This cannot be done easily with any of the dissolved buffer materials currently in use. One advantage is longer buffer life by reduced temperatures and isolation of the buffer material from oxygen.

Step 6 (Reference Numerals 518 & 519)—Condensing of the steam 511 purifies the gas stream coming out of the process to nearly pure $CO_2$ 517. The $CO_2$ 517 can be used or sequestered. The $CO_2$ 517 can be transported to an injection site for sequestration and long-term storage in any of a variety of suitable geologic formations.

Step 7 (Reference Numerals 516 & 517)—Condensing of the steam 511 with removal of the $CO_2$ 517 and water 515 leaves water with impurities 519.

Step 8 (Reference Numeral 520)—The water with impurities 519 is transferred to the water wash 103 as illustrated by the arrow 520.

Microcapsule Making System

Figure 6:
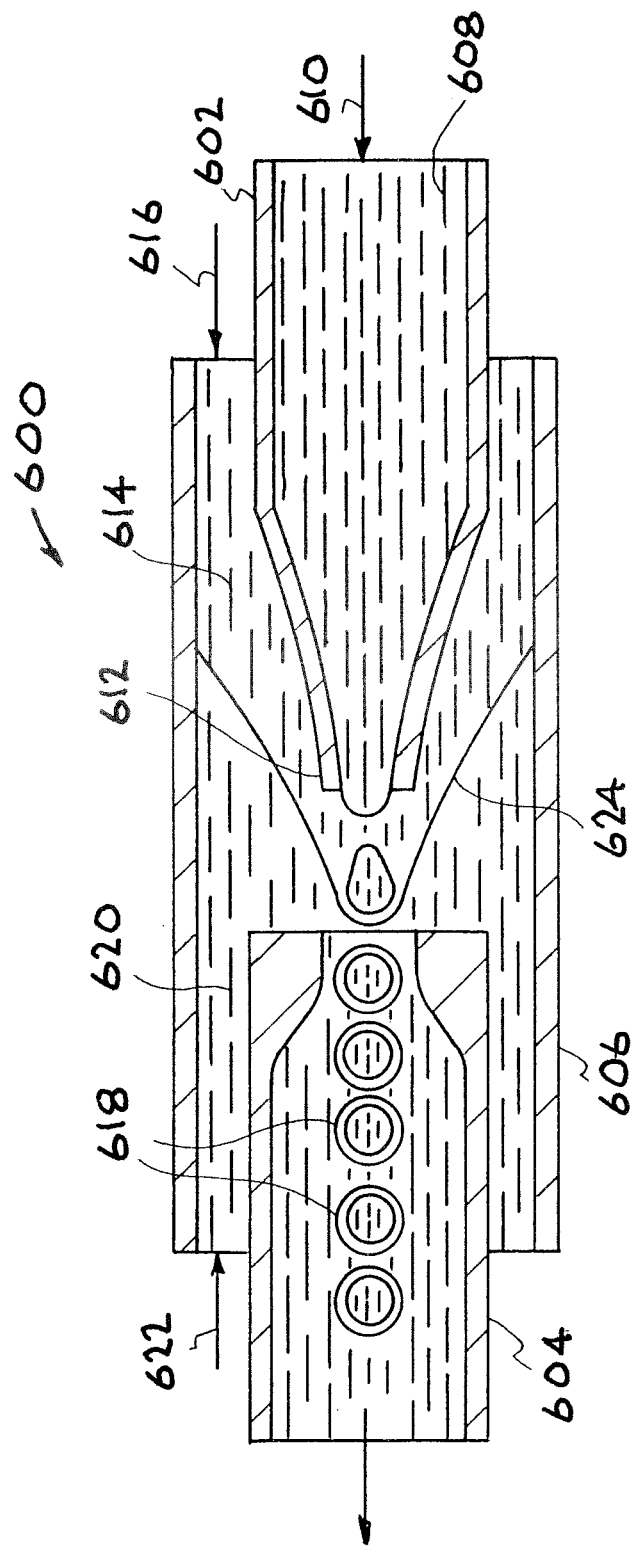
FIG. 6 illustrates a system for making polymer coated capsules.

FIG. 6 illustrates a system for making polymer coated microcapsules. FIG. 6 illustrates a system and method of fabricating double-emulsion microcapsules. The schematically illustrated method 600 will be composed of the following items. The injection tube 602 with a ID (um) and OD 1000 (um), a collection tube 604 with an ID of 500 (um) and OD 1000 (um) and an outer tube 606 of square cross section with ID of 1000 (um) and ID of 1200 (um).

In operation the inner fluid 608 (MEA/H2O) with a viscosity of 10-50 (cP) and a flow rate of 200-800 (Ulh-1) flows in the injection tube 602 in the direction indicated by arrow 610. As this fluid proceeds it passes thru a droplet forming nozzle 612. The formed droplet is released from the nozzle and becomes encased in the middle fluid 614 (NOA Pre-polymer) with a viscosity of 10-50 (cP) and flow rate of 200-800 (uLh-1), the middle fluid 614 is flowing in the direction indicated by arrow 616. The inner fluid droplet 608 becomes encased in the middle fluid 614 forming an encapsulated microcapsules 618 that have a $CO_2$ capturing solvent core with a thin $CO_2$ permeable outer shell. The outer fluid (PVA Stabilizer) with a viscosity of 10-50 (cP) and a flow rate of 200-800 (uLh-1) flowing in the outer tube 606 in the direction indicated by arrow 622. This outer fluid 620 carries the fabricated microcapsules 618 into the collection tube 604. There is a boundary layer 624 that prevents the middle fluid 614 and outer fluid 620 from mixing as they have a large difference in both their viscosity and flow rates. The above described method will produce Microcapsules of a controlled size with an inner fluid (solvent/catalyst) enclosed in a $CO_2$ permeable polymer shell.

Systems for producing microcapsules are described in U.S. Pat. No. 7,776,927 and in U.S. Published Patent Application Nos. 2009/0012187 and 2009/0131543. U.S. Pat. No. 7,776, 927 to Liang-Yin Chu et al, assigned to the President and Fellows of Harvard College, discloses emulsions and the production of emulsions, including multiple emulsions and microfluidic systems for producing multiple emulsions. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0012187 to Liang-Yin Chu et al, assigned to the President and Fellows of Harvard College, discloses multiple emulsions, and to methods and apparatuses for making emulsions, and techniques for using the same. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0131543 to David A. Weitz discloses multiple emulsions, and to methods and apparatuses for making multiple emulsions. A multiple emulsion, as used herein, describes larger droplets that contain one or more smaller droplets therein. The larger droplet or droplets may be suspended in a third fluid in some cases. In certain embodiments, emulsion degrees of nesting within the multiple emulsion are possible. For example, an emulsion may contain droplets containing smaller droplets therein, where at least some of the smaller droplets contain even smaller droplets therein, etc. Multiple emulsions can be useful for encapsulating species such as pharmaceutical agents, cells, chemicals, or the like. In some cases, one or more of the droplets (e.g., an inner droplet and/or an outer droplet) can change form, for instance, to become solidified to form a microcapsule, a lipo some, a polymero some, or a colloidosome. As described below, multiple emulsions can be formed in one step in certain embodiments, with generally precise repeatability, and can be tailored to include one, two, three, or more inner droplets within a single outer droplet (which droplets may all be nested in some cases). As used herein, the term "fluid" generally means a material in a liquid or gaseous state. Fluids, however, may also contain solids, such as suspended or colloidal particles. U.S. Pat. No. 7,776,927 and U.S. Published Patent Application Nos. 2009/0012187 and 2009/0131543 are incorporated herein by this reference.

Mass Transfer

Encapsulated solvents can be used to capture carbon dioxide from power plant flue gas. The limiting step in mass transfer is probably diffusion across the polymer membrane. The mass transfer rate is then proportional to the permeability of the membrane. Permeability has a wide range of values for different polymers. A permeability for $CO_2$ of 100 barrer is chosen as a benchmark because it is higher than most polymers but can be achieved with several different chemistries. At 100 barrer permeability, 200 μm diameter, and 5 μm wall thickness, encapsulated solvents have about 2 orders of magnitude slower absorption per unit surface area than conventional liquid solvents.

A bed of spherical beads is explored as a system design. With 200 μm diameter beads and close spherical packing, such a bed has 2 orders of magnitude higher surface area per unit absorber volume than a conventional packed tower using a liquid solvent. High pressure drop appears to be the primary drawback of this configuration, which is estimated to be orders of magnitude larger than for a conventional packed tower. The high pressure drop is largely due to the low proportion of void space in tight-packed spheres (36%-40%, compared with 90-97% in commercial tower packings).

A system based on a packed bed of beads will be viable if a higher permeability can be achieved (on the order of 1000 barrer), or if more void space can be introduced to the system (e.g. a doubling). In principle, resistance to mass transfer of $CO_2$ into (or out of) the bead can occur in three zones: (1) from the bulkgas to the surface of the polymer shell (gas-phase resistance), (2) through the polymer shell (membrane resistance), and (3) from the inner surface of the shell to the bulk of the inner fluid (liquid-phase resistance). For this calculation, Applicants assume that membrane resistance is overwhelmingly the slowest step and therefore controls mass transfer. In this case the flux across the membrane, J, is given by:

$$J = \frac{\text{mass transfer rate}}{\text{surface area of membrane}} = \frac{P\Delta p}{L}\left[\frac{\text{mol}}{\text{m}^2\text{s}}\right] \quad \text{[Equation 1]}$$

where $\Delta p$ is the pressure drop across the membrane, L is the thickness of the membrane, and P is the permeability coefficient of the polymer. For our purposes, the $CO_2$ pressure on the outside of the shell is the gas-phase partial pressure in the flue gas. Since Applicants assume the inner fluid is a fast solvent, the effective $CO_2$ pressure on the inner wall of the shell is the equilibrium partial pressure of $CO_2$ above the solvent at the appropriate temperature and carbon loading. This is generally small compared to the partial pressure in the flue gas. For example, flue gas typically starts at 15% $CO_2$=0.15 atm=15200 Pa. The equilibrium partial pressure of $CO_2$ for 5M Monoethanolamine (MEA) at 40° C. and 0.3 mol $CO_2$/mol amine is 22 Pa. So for our purposes, $\Delta p$ is equal to the partial pressure of $CO_2$ in the flue gas.

The permeability coefficient depends slightly on temperature and pressure, but is mostly a function of the polymer(s) comprising the membrane. It ranges at least four orders of magnitude. The literature on gas separation with membranes makes much of the trade-off between permeability and "selectivity", that is, the relative permeabilities of $CO_2$ and $N_2$. Higher permiabilities are usually achieved with lower selectivity, and vice versa. However, Applicants achieve selectivity through the solvent, which reacts with $CO_2$ and not with $N_2$, which may drive us toward the most permeable polymer that meets structural requirements. Alternatively, Applicants may be limited by relative selectivity of the membrane for $CO_2$ over solvent.

The synthetic polymer with the largest measured permeabilities is poly(1-trimethylsilylpropyne). This polymer possesses a carbon dioxide permeability of 28,000 barrer and a nitrogen permeability of 4970 barrer. These very large permeabilities are associated with a very large fractional free volume. These permeabilities tend to decrease with time due to slow crystallization of the polymer. This effect can be counteracted by the addition of certain additives.

However, for now Applicants will set aside the possibility of a membrane with very high fractional free volume and consider the more typical polymers. Without knowing the constraints on polymer choice for the encapsulation, Applicants choose 100 barrer as the base case permeability because it appears to be achievable with a variety of different chemistries (polyimides, polyacetylenes, polycarbonates). Applicants will keep in mind that this may be a conservative choice. For perspective, Applicants can compare a permeability of 100 barrer to some representative mass transfer coefficients in $CO_2$ capture systems. Equation 1 is analogous to the classic mass transfer equation across an interfacial boundary:

$$J = K\Delta C$$

where K is the overall mass transfer coefficient and $\Delta C$ is the concentration difference between, in our case, the bulk flue gas and the equilibrium partial pressure of $CO_2$ above the solvent. If Applicants cajole P and $\Delta p$ into units of concentration (assuming STP), then Applicants have $P/L \leftrightarrow K$ in units of length per time. In these units, both coefficients are what physicists might call the "piston velocity". That is, if there were a piston above the interface, moving steadily at the piston velocity and pushing flue gas across the boundary, you would get an equivalent mass transfer rate of $CO_2$. Although there are numerous caveats in comparing these numbers (one being that P is measured empirically using a single gas and a physical pressure drop and the membranes may respond differently to an equivalent concentration gradient), Applicants think it is a safe conclusion that, under our assumptions, mass transfer across the membrane is about 2 orders of magnitude slower than across the interface of a liquid solvent.

However, the mass transfer rate is proportional to surface area, and encapsulation has the potential to provide a lot of surface area compared to standard liquid-gas system. Consider a bed of randomly-packed spherical beads of equal diameter, d and packing density _ (volume of beads/bulk volume). The surface area per bulk volume of absorber is:

$$\frac{S}{V} = \frac{\pi d^2}{\frac{1}{6}\pi d^3 / \rho} = \frac{6\rho}{d} \quad \text{[Equation 2]}$$

For close random packing of spheres, typical values of _ range from 0.60 to 0.64. For comparison, packings for gas/liquid absorbers have solid surface area in the range of 100-1000 m2/m3. The effective interfacial area is usually less, because not all surfaces get wet and some pools stagnate and saturate. Typical values for an MEA system would be 250 m2/m3 for the packing and about 80% area utilization. Thus, Applicants have about two orders of magnitude more surface area in a bed of packed beads than in a typical liquid absorber. So, even with our two orders of magnitude slower mass transfer, the mass transfer performance of the beads is equal to a packed tower. Higher permeabilities, as have been obtained with semicosil, improve the performance.

As a benchmark, Applicants may consider the minimum time it takes for a bead filled with MEA to reach saturation. Building from Equation 1, the loading time, $\tau$, for a bead to reach the liquid saturation concentration of $CO_2$, Csat, is given by:

$$\tau = \frac{(\text{volume of bead}) \cdot C_{sat}}{(\text{surface area of bead}) \cdot (\text{flux})} = \frac{\frac{1}{6}\pi d^3 C_{sat}}{\pi d^2 P \Delta p / L} = \frac{C_{sat} L d}{6 P \Delta p}$$

The theoretical Csat for MEA is 0.5 mol $CO_2$/mol MEA, which for a 30 wt % MEA solution comes to about 10 wt % $CO_2$ or 2.4 M. as a function of bead diameter and wall thickness. This appears to be due to different assumptions about permeability.

Two important parameters for a capture system are gas flow rate and absorber height. The two together determine the capture effectiveness from flue gas $\epsilon = (1 - CO_2 \text{ out}/Ca \text{ in})$. And while slowing the gas low rate increases effectiveness (by increasing the residence time of the gas), it also decreases capital utilization. For example, at half the gas flow rate one needs twice as many absorber towers (or one tower with twice the cross-section) for the same throughput. Absorber height and gas flow rate both also determine the pressure drop across the absorber which in turn contributes to energy use. Thus, a meaningful selection of gas flow rate and absorber height cannot be made without considering capital cost against the cost of energy. However, Applicants can make some rough assumptions to see if Applicants are in a tenable design space.

Suppose again that Applicants have a bed of randomly-packed beads of diameter d and packing density p. If the mass transfer rate follows Equation 1 then mass transfer is first order with the $CO_2$ concentration in the flue gas. As a parcel of gas moves through the absorber, the $CO_2$ concentration then follows first order decay:

$$C(t) = C_{in} e^{-K_{gas} t}$$

where C(t) is the concentration of $CO_2$ in the gas parcel at time t and Kgas is the rate constant of $CO_2$ loss with units of inverse time. Applicants can also think of Kgas as the mass transfer rate in the parcel per unit concentration:

$$K_{gas} = \frac{Q}{V_{gas}} \cdot \frac{1}{C(t)}$$

Combining Equations 1 and 2 Applicants have the mass transfer rate per unit volume of absorber:

And the volume of gas per unit volume absorber is:

$$\frac{V_{gas}}{V} = (1 - \rho)$$

Applicants are almost ready to combine the above three equations to find Kgas but Applicants have a slight snag in that P is defined to include units of inverse pressure instead of inverse concentration. As in Table 1, Applicants will cajole P to include units of inverse concentration by assuming STP.

Applicants can then replace $\Delta p$ by C and get:

$$K_{gas} = \frac{Q}{V_{gas}} \cdot \frac{1}{C(t)} = \frac{6 P C(t) \rho V}{dL(1-\rho)V} \cdot \frac{1}{C(t)} = \frac{6 P \rho}{dL(1-\rho)}$$

Applicants can now calculate the residence time of flue gas, $\tau_{gas}$, required for particular capture effectiveness, For $CO_2$ capture from power plants, Applicants typically assume the capture system must be at least 90% effective. For our base case of P=100 barrer, wall thickness=5 μm, and d=100 μm, Applicants calculate a residence time of 1.6 s. Again, the flow rate of gas in the tower is a tunable parameter, but for a sense of scale Applicants can consider that the superficial velocity in a large-scale packed tower is typically on the order of 1 m/s. That would put the absorber height in our base case at about 4 m. This is comfortably inside the realm of industrial practice for a packed tower. However, the types of packings used in those towers have much more void space—90-97% in the physical packing, compared with our 38%.

The pressure drop across a bed of packed spheres is a well-studied problem. It can be estimated from the semiempirical Ergun Equation, which derives from an energy balance on kinetic energy and frictional losses:

$$\frac{\Delta P_{bed}}{H} = 150 \cdot \frac{\rho^2 \mu V_s}{\Phi^2 (1-\rho)^3 d^2} + 1.75 \cdot \frac{\rho \cdot \rho_{gas} V_s^2}{(1-\rho)^3 \Phi d} \quad \text{[Equation 3]}$$

where:
- $\Delta P$ is the pressure drop across the bed [Pa]
- H is the height of the bed [m]
- p is still the bulk packing density of beads, assumed 0.62
- $\mu$ is the dynamic viscosity of the fluid, assumed 2.0×10-5 kg/(m·s) (the dynamic viscosity of air at 40° C.)

In the previous sections on packed towers, Applicants found that the tower height required for a given capture effectiveness is proportional to the superficial gas velocity, Vs:

$$H = \frac{V_s \cdot \tau_{gas}}{(1-\rho)}$$

However, the cross-sectional area of the tower required for a given flow of flue gas is inversely proportional to the velocity:

$$\text{Area} = \frac{\text{Flowrate}}{V_s}$$

Which means that the packing volume (H×Area) is actually constant with Vs. Applicants also know that the pressure drop falls strongly with Vs. Therefore, if one had a very wide, very short tower, one may be able to overcome the pressure drop concerns of a conventional packed tower without necessarily needing more beads. In a conventional configuration, this would be impractical, because space and capital required for flow distributors would be overwhelming and edge effects would diminish mass transfer efficiency. But perhaps these problems can be overcome by turning the tower on its side, if you will.

Grain drying systems, which contact massive amounts of granular solids with hot air, offer a good analogy for encapsulated solvents. There are many types of systems for grain and similar drying applications, including fluidized beds, rotating trays, and many which look much like a typical packed bed. Applicants can model the walls of moving-bed system as a perforated plate through which the flue gas must flow. The holes should allow gas to pass through but retain the beads without impeding their movement. Applicants assume the plate is made from solid steel or similar alloy, as opposed to a wire mesh or fabric. These latter options would yield a lower pressure drop and probably lower capital expense, but could not hold against much total pressure and might abrade the beads. The conclusion of this section is that the pressure drop across an appropriate plate is generally less than 1 kPa—small compared to the likely pressure drop across the beads themselves. However, the strength of the plates, and the ease of fabricating relatively small holes in thick plates, may be nontrivial considerations.

Empirical correlations for pressure drop across a perforated plate which depend only on open area and air velocity are widely available. However, these are based on plates with much larger holes than Applicants require, which allows the friction of flow inside the hole, and thus the thickness of the plate, to be neglected.

In general, the pressure drop across a perforated plate, $\Delta P_{plate}$ consists of losses from compression of the gas into the holes, friction through the holes, and then expansion on the other side. The following expression can be used for calculating the pressure drop across a dry, perforated plate. The terms within the brackets address those three kinds of losses, respectively:

$$\Delta P_{plate} = k\left[0.4\left(1.25 - \frac{A_h}{A_c}\right) + 4f\left(\frac{T}{d_h}\right) + \left(1 - \frac{A_h}{A_c}\right)^2\right]\frac{V_h^2 \rho_{gas}}{2}$$

where:

$\frac{A_h}{A_c}$ is the ratio of hole area to total plate area [ ]
T is the thickness of the plate [m]
$d_h$ is the diameter of the holes [m]
$V_h$ is the velocity of gas inside the hole [m/s], which is relate to the superficial velocity by:

$$V_h = \frac{V_s}{A_h/A_c}$$

f is the Fanning friction factor, discussed below [ ]
k is an empirical correction, given by McAllister et. al. as a complicated function of $T/d_h$. It ranges from about 0.85 to 1.9 [ ].

The Fanning friction factor (equal to one fourth of the Darcy friction factor) is a function of the Reynolds number of the system, Re, which for flow through smooth, circular pipes, and correcting the superficial velocity to the velocity inside the holes, is defined by:

$$Re = \frac{\rho_{gas} V_s d_h}{\mu(A_h/A_c)}$$

In our reasonable parameter space, Re ranges from 0.32 to 32, which is solidly in the laminar flow regime (for flow in a pipe, Re<2300 is generally laminar). In the laminar regime, Applicants can calculate the Fanning friction factor by:

$$f = \frac{16}{Re}$$

Now Applicants have to make some assumptions about the hole size and thickness of the plates. It seems fairly obvious that the holes should be smaller than the beads (dh<d), but not much smaller. Applicants will assume dh=75 µm for the base case. The required thickness of the plate is a structural engineering question that can't really be answered without a detailed system design. However, the wall thickness of steel pressure vessels may offer some guidance. From the previous discussion on packed beds, Applicants may expect pressure drops across the bed on the order of 100 kPa. For a large (diameter=2 m), cylindrical vessel of typical steel at that pressure, the required wall thickness is 1.2 mm. One can play with the assumptions about curvature, pressure, and steel strength and get +/− a factor of 3 or so. Now, for our hole size, 1.2 mm actually gives a T/dh ratio a factor of 2 outside the range of McAllister et al.'s data, and thus Applicants don't know quite what to use for k (assume k=2) because at the end of the range, k=1.5 and is trending up. It also may be challenging from a fabrication perspective. Applicants haven't seen many applications using holes that small, let alone with such thick plates. On the other hand, the structural design space is so open that thicker plates should be usable.

The last parameter to consider is the fraction of open area, Ah/Ac. Perforated metals are commonly available with open area up 60% (IPA, 1993), however, that comes at the price of reduced strength. At 20% open area, strength is reduced by about 50%; at 60% open area, strength is reduced to 15-20% of solid-plate strength. Applicants have assumed 20% open area.

The most important thing to note from these results is probably that the y-axis is in Pa instead of kPa; these pressure drops are small compared to the pressure drop across a bed of beads.

Applicants will assume a capture effectiveness of $CO_2$ from flue gas of 90%. With the height fixed, the gas velocity, Vs, is adjusted to achieve 90% capture. The pressure drop can then be calculated. Much of this parameter space seems to fall under the rough upper bound Applicants proposed for pressure drop of 140 kPa, which is encouraging. An interesting feature of the moving-bed configuration is that the pressure drop is higher for higher-permeability beads, because the gas is being pushed though faster. The trade-off is capital cost: the higher the permeability, the less wall area is required for a given size power plant.

Now let's put the pieces together in an example. Suppose Applicants have 200 μm beads with 400 barrer permeability. The superficial velocity required to achieve 90% capture is 0.18 m/s. At this rate, Applicants need 49 commercial grain dryer-sized units to handle a 430 MWe coal plant. Each operates with a pressure drop of 34.7 kPa across the bed and 0.25 kPa across the inner and outer walls (assuming 1.2 mm wall thickness). In energy terms, Applicants expect that this pressure drop is entirely manageable. Notably, the force due to the pressure drop must be resisted physically by the outer wall and by the beads, especially those closest to the outer wall, 35 kN/m2 is a substantial force, equivalent to being at the bottom of about 12 ft of water column. The left side of the beads on the left side of the diagram are being pressed against the outer wall with that force, which translates to about 2 mN per bead. Nanoidentor compression tests are analogous to this situation. Applicants have not conclusively tested our own beads yet, but estimates based on the literature and polymer properties indicate that they will be able to withstand tens of mN of force before rupturing. Supposing this is correct and the beads are not at risk of rupturing, they still may substantially deform, which in turn would decrease void space and increase pressure drop. And so investigation of the deformation properties of the beads appears to be in order. Another concern is that the pressure would pin the beads in place, impeding flow which in grain drying systems occurs by gravity. The leftward pressure on the leftmost beads overwhelms gravity by a factor of 4×105 which seems to preclude any gravitational settling of the beads. Applicants could overcome this by giving the gas flow a downward component, for example by having more holes toward the bottom of the outer wall.

Catalysis and Choice of Working Solvent

The working model is that $CO_2$ physically diffuses through the polymer shell and then reacts in the inner fluid to form carbonates or complexes. This approach implies that a catalyst, if used, should be dissolved in the inner fluid or anchored to the inner surface of the shell. The catalyst is only helpful in this case if reaction in the solvent would otherwise slow mass transfer. In the previous calculations Applicants assumed that reaction in the solvent did not significantly slow the reaction, either by use of a fast solvent or by enhancing the reaction with a catalyst.

Mass transfer through a series of media can be described by the electrical resistance model, where the resistance, R, is the inverse of the mass transfer coefficient, K. If Applicants neglect gas-side resistance (which is probably a good assumption), then Applicants have:

$$R_{total} = R_{shell} + R_{solvent} \Longrightarrow \frac{1}{K_{total}} = \frac{1}{K_{shell}} + \frac{1}{K_{solvent}}$$

If one mass transfer coefficient is much smaller than the other, it will tend to dominate the total and the larger one can be neglected. In a bead filled with one of these solvents, the "equivalent permeability" is the permeability for which the shell and solvent are contributing equally to mass transfer resistance. For example, for a bead with 5 μm wall thickness filled with 0.33 M NaOH, the equivalent shell permeability is 10,000 barrer. If Applicants had a shell with 1,000 barrer permeability, then the solvent would be contributing only 9% of the total resistance, which is to say, addition of a catalyst could speed the rate of mass transfer by, at most, 9%. If Applicants had a shell with permeability of 10,000, then a catalyst could speed the rate of mass transfer by, at most, 50%.

Note that K depends on a number of factors, such as turbulence in the measurement system, temperature, and precise composition of the solution, so these values should be taken as order-of-magnitude guides only. However, considering that the highest measured permeability for a polymer membrane is 28,000 barrer, it seems apparent that a catalyst would not be very helpful in beads filled with a fast-reacting solvent like MEA. However, the catalyst should be helpful for a slower solvent like sodium bicarbonate, paired with a membrane with permeability of a few hundred barrer or higher.

Those conclusions still assume that the catalyst is dissolved in the inner fluid or anchored to the inner surface of the shell. An alternative approach would be to embed catalyst in the polymer shell or on the outer surface of the shell. This approach implies that $CO_2$ is hydrolyzed on the outer surface or somewhere inside the shell material and then diffuses to the inner fluid as carbonate. In this case, Applicants can model the shell as an immobilized liquid membrane. The shell material has micro- or nano-pores where the solvent is held by capillary pressure. $CO_2$ diffuses from the outside of the microcapsule to the bulk fluid on the inside through the pore liquid. Mass transfer into the beads is controlled by diffusion and reaction of species in the pore channel, including $CO_2$ (aq), $HCO^-_3$, and protonated and unprotonated buffer. The catalyst must be present in the pore channel to be effective.

Layered Microcapsule

Figure 7:
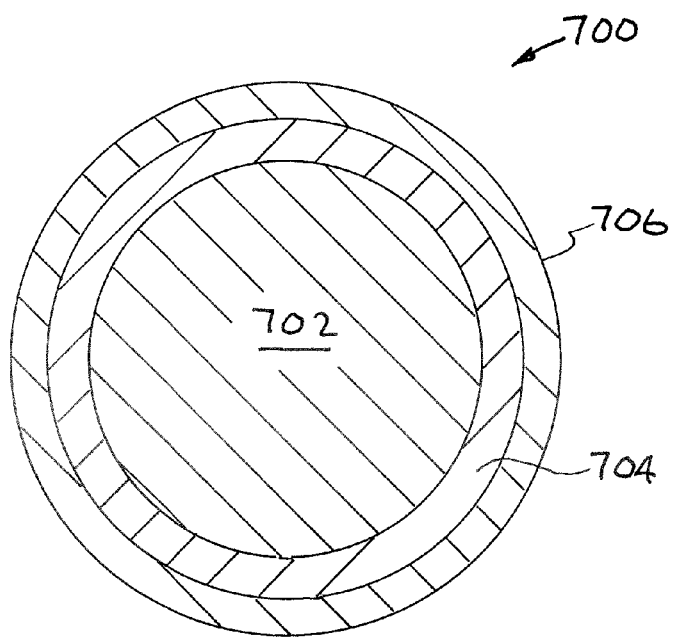
FIG. 7 illustrates use of catalysts and polymer additives to improve capsule performance.

The system 700 illustrated in FIG. 7 shows a cross section of a microcapsule 702. In FIG. 7, 704 is a layer of catalyst or enzyme added to enhance the reaction rate of carbon dioxide to dissolved carbonate. This may be either dissolved in the polymer, the solvent, or as a separate layer (a triple emulsion) during bead creation. FIG. 7 shows the addition of fibers, nanotubes, or other permeability-enhancing components 7-6 that improve the permeability of the capsule, or its strength or abrasion resistance. These could include carbon nanotubes, silicon carbide, nylon, or a variety of other materials that enhance the basic function of the polymer shell. In the case of 706 the fibers are oriented along the shell radius for purposes of strength improvement or abrasion resistance.

EXAMPLE 5

Figure 8:
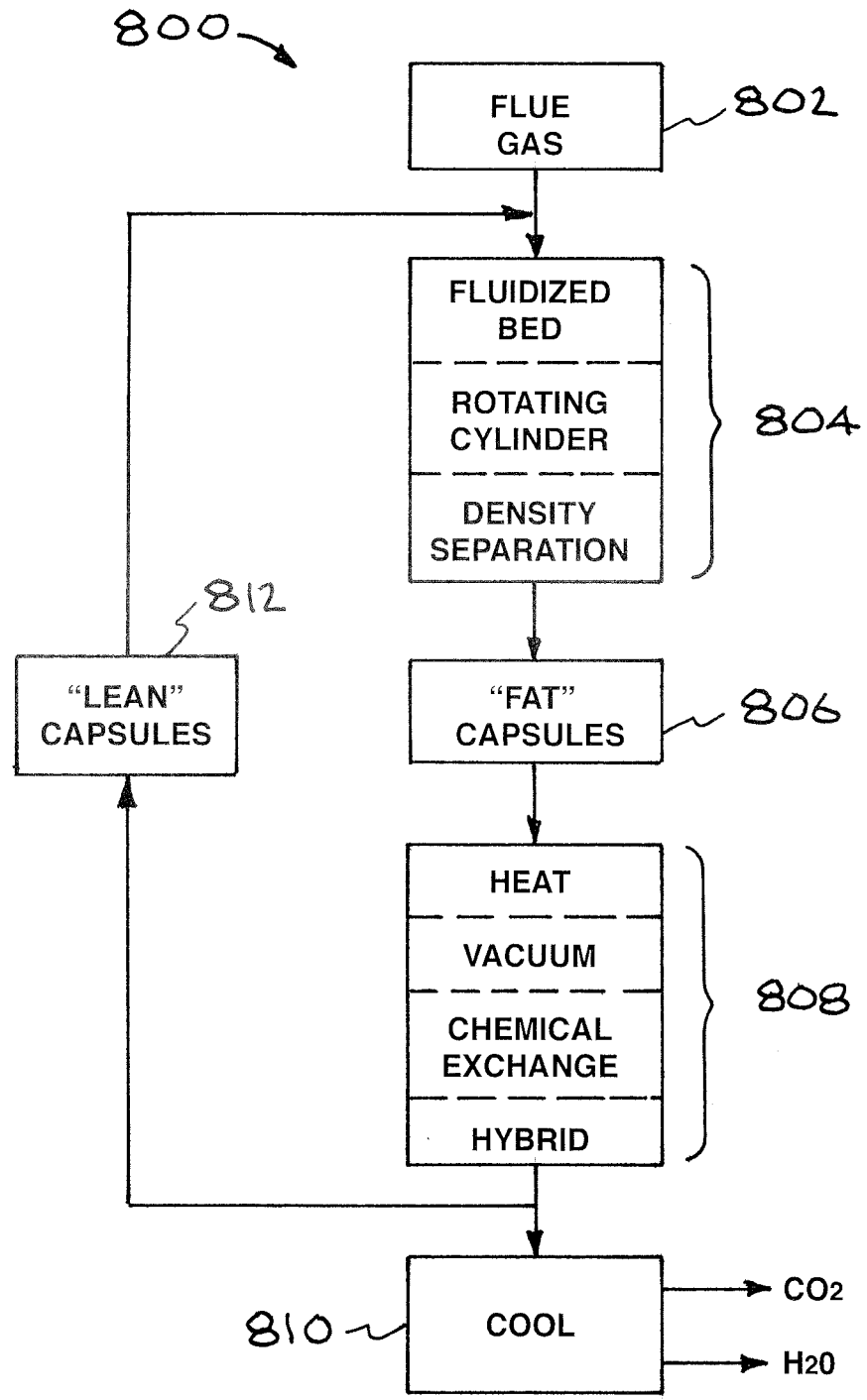
FIG. 8 illustrates flue gas (e.g., $CO_2$, $H_2O$, $N_2$, $SO_x$, $NO_x$) and/or other gas mixtures being processed by passing it upwards through a absorption tower while being contacted with a suspension of polymer coated capsules.

In example 5, a system for carbon dioxide removal from gas mixtures is described and illustrated. Example 5 is illustrated by FIG. 8 showing a method of separating $CO_2$. The method is designated generally by the reference numeral 800. The steps of the method 800 are described below.

Method Steps—FIG. 8

Step 1 (Reference Numeral 800)—Flue gas (e.g., $CO_2$, $H_2O$, $N_2$, $SO_x$, $NO_x$) and/or other gas mixtures is processed by passing it upwards through a absorption tower while being contacted with a suspension of polymer coated capsules. The capsules will have a diameter and density such that they are sufficiently buoyant in the upward flowing gas stream that they behave as a fluidized bed. The system is operated such that a suitable contact time is achieved for gas reactions to take place and $CO_2$ separated from the gas mixture. During contact with the gas mixture, the capsules will over time become enriched in $CO_2$ because the solvent contained within the capsule has a strong affinity for $CO_2$. Some or most of the $CO_2$ originally in the gas mixture is now contained within the capsules.

The solvent may be an amine, an inorganic base, or any other solvent which has a high capacity for take-up of $CO_2$. Preferential partitioning of $CO_2$ into the capsule is due to the relatively higher solubility of $CO_2$ in the encapsulated solvent vs. other components of the mixed gas stream such as nitrogen or oxygen. The capsules remain in the gas stream until they contain sufficient $CO_2$ such that they are ready for removal from the gas contactor for transport to the regenerator where the contained $CO_2$ will be removed.

In one embodiment, the capsules remain in the system for some period of time before they are entirely removed from the system. As such the system is operated in a batch mode.

In another embodiment, the capsules are fed and removed continuously at a rate such that the mean residence time allows for sufficient $CO_2$ recovery to meet requirements. In this case, not all the capsules will be fully loaded but the average loading is sufficient to provide for the desired flux of $CO_2$ removal. As such the system operates in a continuous mode.

In another embodiment, the capsule solvent is chosen and designed such that as the capsules load with $CO_2$ they become progressively more dense than unloaded capsules and as a consequence the loaded capsules self-separate and drop to the bottom of the tower where they are removed for transport to the regenerator described in Step 2. As such the system operates in a continuous mode.

In another embodiment, the capsules contact the mixed gas stream in a rotating tipped cylinder such that the capsules form a bed residing on the lower surface of the rotating cylinder and cascade down the length of the cylinder, while the gas stream passes upwards through the cylinder contacting the cascading capsules. At the bottom, the capsules are removed and cycled back to the top for additional loading. In this embodiment, the system may be operated either in batch or continuous mode. The advantage for this contact method is that the capsules no longer must be sufficiently buoyant such that they form a fluidized bed in the gas tower, as is the case for the other contact scenarios.

The solvent contained within the capsule is chosen such that is has a preferentially high solubility of $CO_2$ and low solubility of other gas stream components such as nitrogen and oxygen. Solvents that are alkaline have this property because the $CO_2$ will ionize in them to form bicarbonate ($HCO_3-$) and carbonate ($CO_3-$) species which are highly soluble in aqueous solutions and in aqueous solutions of amines. The solvent of choice may be an amine such as methylethanolamine (MEA) or other amine-based solvents that have high solubilities for $CO_2$. The solvent may be an inorganic solution of a base, such as sodium hydroxide, potassium carbonate, sodium borate, or sodium phosphate or any of many other inorganic solvents that are bases in the sense of acid-base reactions, and have high solubilities of carbon dioxide. It is the solvent that provides selectivity for $CO_2$. The capsule wall will be permeable to all of the gas components including water, and does not provide selectivity for $CO_2$.

Step 2 (Reference Numeral 800)—The loaded "fat" capsules from Step 1 are now ready for $CO_2$ extraction "regeneration" in order to produce a concentrated $CO_2$ stream. The goal is to produce a relatively pure stream of $CO_2$ such that it can be compressed to a liquid form for transport or storage. As such the derived $CO_2$ stream must not contain appreciable amounts of non-condensable gases such as nitrogen, oxygen or argon.

Regeneration to remove the contained $CO_2$ is carried out by heating the capsules to an elevated temperature where the equilibrium content of $CO_2$ is much lower than the equilibrium content of $CO_2$ during collection from the mixed gas stream. The temperature may be around 100 C or may be a much higher temperature. The optimal temperature of regeneration depends on the type of solvent contained within the capsule and the $CO_2$ loading.

The capsules may be regenerated by contacting them with hot steam, which will produce a gas containing mainly $CO_2$ and $H_2O$, and which upon cooling will self-separate into a dominantly $CO_2$ gas phases and liquid water (Step 3).

The capsules may be regenerated by heating in pressurized liquid water which will upon lowering of the containing pressure will produce a stream of relatively pure $CO_2$.

During heating, $CO_2$ and water escape from the capsule into the surrounding gas phase. The solvent is chosen such that it is not volatile at the temperature of regeneration and therefore does not preferentially leave the capsule with $CO_2$ and water, although small amounts may leave the capsule for some solvents and can be tolerated for some applications. In addition, for sparingly volatile solvents such as amines, the capsule shell reduces the flux of the solvent out of the capsule. This allows the working temperature of regeneration for the encapsulated solvent to be higher than is possible for systems where the amine solvent is not encapsulated. Regeneration at a higher relative temperature produces a higher partial pressure of $CO_2$ which lowers the energy needed for compression and liquefaction of $CO_2$ which may lower the overall cost of $CO_2$ collection.

Another advantage of encapsulation of amine solvents is that the liquid amine does not directly contact materials used in the regenerator, such as metals, which reduces corrosion and allows potentially less expensive construction materials. For example, carbon steel can be used to replace stainless steel. A related benefit is that if thermal degradation of the solvent takes place, the degradation products tend to remain within the capsules and do not contact the containment housing and in so doing cause damage due to corrosion or scaling.

Step 3 (Reference Numeral 800)—The regenerated capsules that have been thermally treated are now have low $CO_2$ contents ("lean") and are suitable for another cycle of $CO_2$ capture. The capsules may be removed from the gas or liquid water using a mechanical filter of any of a variety of type and designs. The separated capsules are then returned to Step 1 to begin another cycle.

Separation of the $CO_2$ from water takes place by cooling the hot gas to produce liquid water and a separate $CO_2$ gas phase. It is advantageous in this step and in the overall process to make use of heat exchangers to capture heat from the condensation of steam, if it is generated, and use it to heat the incoming "fat" stream of encapsulated $CO_2$.

The carbon dioxide that has been separated from the gas mixture can be sold, stored, sequestered, or otherwise disposed of.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A microcapsule for carbon dioxide capture from flue gas and other industrial gas as sources, comprising:
   a microcapsule body,
   a surface layer on said microcapsule body that is permeable o carbon dioxide wherein said surface layer includes carbon fibers, and
   stripping solvents encapsulated within said microcapsule body, wherein said stripping solvents are soluble to the carbon dioxide and wherein to the carbon dioxide migrates through said surface layer and is taken up by said stripping solvents separating the carbon dioxide capture from flue gas and other industrial gas.

2. A microcapsule for carbon dioxide capture from flue gas and other industrial gas sources, comprising:
   a microcapsule body,
   a surface layer on said microcapsule body that is permeable to carbon dioxide wherein said surface layer includes nanotubes, and
   stripping solvents encapsulated within said microcapsule body, wherein said stripping solvents are soluble to the carbon dioxide and wherein to the carbon dioxide migrates through said surface layer and is taken up by said stripping solvents separating the carbon dioxide capture from flue gas and other industrial gas.

3. An apparatus for carbon dioxide capture from flue gas and other industrial gas containing carbon dioxide, comprising:
   a system for exposing microcapsules having a coating and stripping material encapsulated in said microcapsules to the flue gas and other industrial gas containing carbon dioxide, wherein said coating is permeable to the carbon dioxide and wherein the carbon dioxide migrates through said coating and is taken up by said stripping material; and
   a system for driving off the carbon dioxide from said microcapsules thereby separating the carbon dioxide from the from flue gas and other industrial gas.

4. The apparatus for carbon dioxide capture from flue gas and other industrial gas containing carbon dioxide of claim 3 wherein said stripping solvents are primary, secondary, tertiary, and hindered amines, caustic solutions, ionic buffer solutions, ammonia, or other solvents having solubility of carbon dioxide.

5. The apparatus for carbon dioxide capture from flue gas and other industrial gas containing carbon dioxide of claim 3 wherein said stripping solvents are amines.

6. The apparatus for carbon dioxide capture from flue gas and other industrial gas containing carbon dioxide of claim 3 wherein said coating is made of a porous solid.

7. The apparatus for carbon dioxide capture from flue gas and other industrial gas containing carbon dioxide of claim 3 wherein said coating includes carbon fibers.

8. The apparatus for carbon dioxide capture from flue gas and other industrial gas containing carbon dioxide of claim 3 wherein said coating includes nanotubes.

9. The apparatus for carbon dioxide capture from flue gas and other industrial gas containing carbon dioxide of claim 3 wherein said coating is made of any of several families of polymers, including polystyrene, polyethylene, polypropylene, and nylon.

10. A method of carbon dioxide capture from flue gas and other industrial gas containing carbon dioxide, comprising the steps of:
    providing microcapsules having a coating and stripping material encapsulated in said microcapsules, wherein said coating is permeable to the carbon dioxide;
    exposing said microcapsules having a coating and stripping material encapsulated in said microcapsules to the flue gas and other industrial gas containing carbon dioxide, wherein the carbon dioxide migrates through said coating and is taken up by said stripping material; and
    separating the carbon dioxide from the flue gas and other industrial gas containing carbon dioxide by driving off the carbon dioxide from said microcapsules.

11. The method of carbon dioxide capture from flue gas and other industrial gas containing carbon dioxide of claim 10 wherein said step of providing microcapsules having a coating and stripping material encapsulated in said microcapsules comprises providing micorcapsules having a coating and stripping solvents that are primary, secondary, tertiary, and hindered amines, caustic solutions, ionic buffer solutions, ammonia, or other solvents having solubility of carbon dioxide encapsulated in said microcapsules.

12. The method of carbon dioxide capture from flue gas and other industrial gas containing carbon dioxide of claim 10 wherein said step of providing microcapsules having a coating and stripping material encapsulated in said microcapsules comprises providing microcapsules having a coating and stripping solvents that are amines encapsulated in said microcapsules.

13. The method of carbon dioxide capture from flue gas and other industrial gas containing carbon dioxide of claim 10 wherein said step of providing microcapsules having a coating and stripping material encapsulated in said microcapsules comprises providing micorcapsules having a coating made of a porous solid and stripping material encapsulated in said microcapsules.

14. The method of carbon dioxide capture from flue gas and other industrial gas containing carbon dioxide of claim 10 wherein said step of providing microcapsules having a coating and stripping material encapsulated in said microcapsules comprises providing microcapsules having a coating that includes carbon fibers and stripping material encapsulated in said microcapsules.

15. The method of carbon dioxide capture from flue gas and other industrial gas containing carbon dioxide of claim 10 wherein said step of providing microcapsules having a coating and stripping material encapsulated in said microcapsules comprises providing microcapsules having a coating that includes carbon nanotubes and stripping material encapsulated in said microcapsules.

16. The method of carbon dioxide capture from flue gas and other industrial gas containing carbon dioxide of claim 10 wherein said step of providing microcapsules having a coating and stripping material encapsulated in said microcapsules comprises providing micorcapsules having a coating made of any of several families of polymers, including polystyrene, polyethylene, polypropylene, and nylon and stripping material encapsulated in said microcapsules.

17. A method of separating carbon dioxide from a gas mixture including carbon dioxide, comprising the steps of:

providing microcapsules having a coating and stripping solvents encapsulated in said microcapsules, wherein said coating is permeable to carbon dioxide;

exposing said microcapsules having a coating and stripping solvents encapsulated in said microcapsules to the gas mixture including carbon dioxide, wherein the carbon dioxide migrates through said coating and is taken up by said stripping solvents; and separating the carbon dioxide from the gas mixture by driving off the carbon dioxide from said microcapsules.

18. The method of separating carbon dioxide from a gas mixture including carbon dioxide of claim 17 wherein said stripping solvents are primary, secondary, tertiary, and hindered amines, caustic solutions, ionic buffer solutions, ammonia, or other solvents having solubility of carbon dioxide.

19. The method of separating carbon dioxide from a gas mixture including carbon dioxide of claim 17 wherein said coating is made of any of several families of polymers including polystyrene, polyethylene, polypropylene, and nylon.

* * * * *